United States Patent
Seki et al.

[11] Patent Number: 5,157,598
[45] Date of Patent: Oct. 20, 1992

[54] ROUGH MACHINING NC DATA CREATION METHOD

[75] Inventors: Masaki Seki, Tokyo; Hidenori Meguro, Yamanashi, both of Japan

[73] Assignee: Fanuc Ltd, Yamanashi, Japan

[21] Appl. No.: 490,593

[22] PCT Filed: Sep. 7, 1989

[86] PCT No.: PCT/JP89/00919
§ 371 Date: May 2, 1990
§ 102(e) Date: May 2, 1990

[87] PCT Pub. No.: WO90/02979
PCT Pub. Date: Mar. 22, 1990

[30] Foreign Application Priority Data
Sep. 13, 1988 [JP] Japan .................. 63-229346

[51] Int. Cl.⁵ .................. G06F 15/46; G05B 19/19
[52] U.S. Cl. .................. 364/191; 364/192; 364/474.35
[58] Field of Search .......... 364/191, 474.18, 474.28, 364/474.29, 474.34, 474.35, 474.37, 192, 474.2, 474.03; 318/572

[56] References Cited
U.S. PATENT DOCUMENTS 4,386,408  5/1983  Imazeki et al. ............. 364/474.03
4,951,217  8/1990  Clark et al. ............... 364/474.2
5,043,906  8/1991  Jepson ..................... 364/474.34

Primary Examiner—Jerry Smith
Assistant Examiner—Paul Gordon
Attorney, Agent, or Firm—Staas & Halsey

[57] ABSTRACT

Provided is a method of creating NC for rough machining using surface data obtained by digitizing a model surface. A traveling distance Ki is determined between a present target tool position (Pck') and an immediately preceding tool position [PC(k−1)']. When the distance ki is less than a predetermined value L, NC data for rough machining are created in such a manner that a tool will move linearly between the present tool position (Pck') and the immediately preceding tool position [Pc(k−1)']. When the distance Ki is greater than the predetermined value L, the distance is partitioning into a plurality of set distances $l_0$, and a check is made at each partitioning point (Pnj) to determine whether the tool (TL) will intersect a shape approximating surface (Sm). In case of intersection, tool position at each point (Pnj) is corrected in the height direction to avoid intersection, and NC data for rough machining are created in such a manner that a tool position (Pnj') resulting from the correction processing will be traversed.

14 Claims, 10 Drawing Sheets

ROUGH MACHINING NC DATA CREATION METHOD

BACKGROUND OF THE INVENTION

1. Technical Field

This invention relates to a method of creating NC data for rough machining and, more particularly, to an NC data creation method for subjecting a workpiece to rough machining using surface data obtained by digitizing a model surface.

2. Background Art

A method is available for creating NC data, which is for performing machining in accordance with the shape of a model, using model-surface data (position indicative of the center of a stylus) digitized by tracer control.

FIGS. 13(a) and (b) are explanatory views in which surface data of a model MDL are digitized by two-way tracing of an X-Z surface. FIG. 13(b) is a partially enlarged view. A stylus STL is transported along the X axis at a predetermined tracing velocity and moves up and down along a model MDL in the Z-axis direction, and three-dimensional position data (coordinates) of the stylus are read in and stored at predetermined times or whenever a see value exceeds a tolerance value. A predetermined amount of pick-feed is performed along the Y axis when the boundary of a tracing region TRR is reached. Thereafter, while similar surface tracing is being performed, the position of the stylus STL is monitored, the surface of the model MDL is digitized by reading in the position data, and NC data are subsequently created using the surface data.

When NC data for rough machining are created using position data digitized by such tracing and machining is performed based on the NC data while effecting a tool-diameter offset using a tool TL whose diameter R is larger than a diameter r of the stylus STL, the tool TL is obstructed by the workpiece WK and may be broken or caused to cut in too deeply (see FIG. 14). Accordingly, the applicant has already proposed a method of checking for interference by a rough machining tool and of correcting tool path in a case where interference will occur.

In accordance with this proposal, and assuming that the model surface has been approximated in step-shaped fashion using the digitized position data and that a predetermined point on each horizontal shape approximating surface is one point constituting a tool path, a point is checked to determine whether the tool interferes with other shape approximating surfaces when the center Pc of the tool is situated at a position obtained by a tool offset from the abovementioned point. In a case where interference will occur, the position Pc of the tool center is moved correctively to a height to avoid interference and the NC data for rough machining are created based on the tool position following the correction.

With this conventional interference checking method, however, a check to determine whether the tool TL will interfere with a shape approximating surface Sa is not carried out while the tool moves from a tool position Pck' (FIG. 15) to a subsequent tool position Pc(k+1)'. Consequently, the tool may interfere with the workpiece at the time of machining, and if machining is performed under these conditions, the tool may break or cut in too deeply.

Accordingly, an object of the present invention is to provide a method of creating data for rough machining in which a tool will not interfere with a workpiece when the tool is moved from one tool position to the next tool position.

SUMMARY OF THE INVENTION

In accordance with the present invention, the foregoing object is attained by a step of partitioning a distance between a target tool position and an immediately preceding actual tool position into a plurality of segments between partitioning points while the distance between the partitioning points is greater than a predetermined value, a step of checking to determine whether the tool will intersect a model approximating surface at each partitioning point, and in a case where intersection will occur, a step of correcting tool position at each partitioning point in a height direction in such a manner that intersection will not occur.

DESCRIPTION OF THE PREFERRED EMBODIMENTS

Figure 1A:
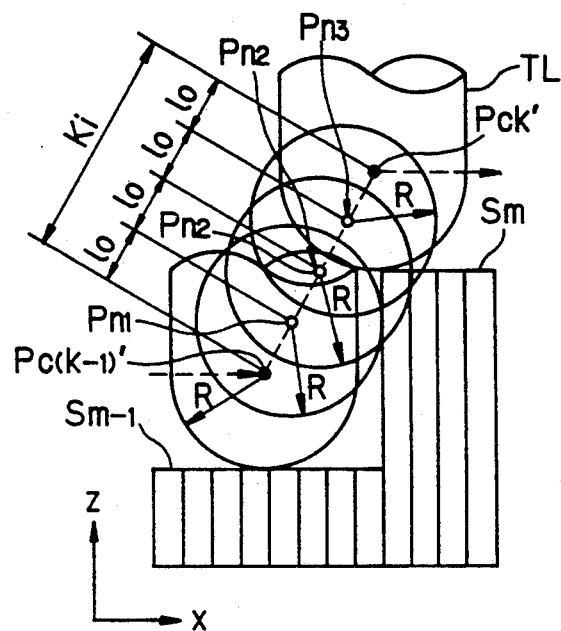
FIGS. 1(a) and 1(b) are views for describing the general features of the present invention.
Figure 1B:
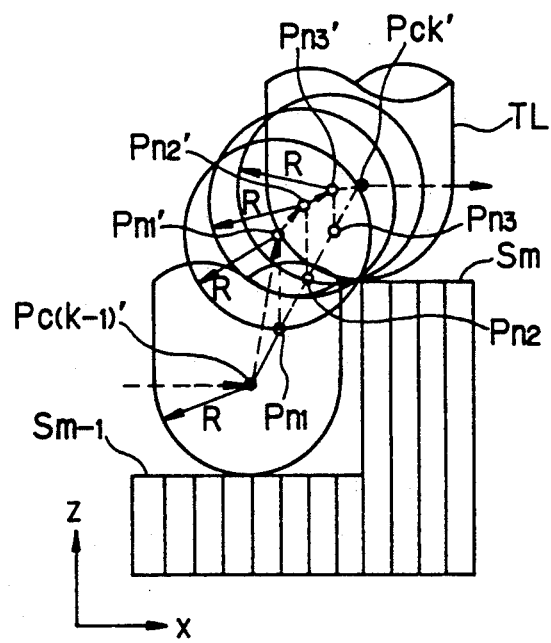

FIG. 1 is a view for describing the general features of a method of creating NC data for rough machining according to the present invention. It will be assumed that the model surface has already been approximated in step-wise fashion, and that processing for rough machining NC data has proceeded up to a point Pc(k−1)'. In creating a rough machining path from the present tool position Pc(k−1)' on a horizontal shape approximating surface to a tool position Pck' on the next horizontal shape approximating surface, first a traveling distance Ki between the next tool position Pck' and the present tool position Pc(k−1)' is obtained, the distance Ki and a predetermined value L are compared in size, and when Ki<L holds, NC data for rough machining are created in such a manner that the tool will move linearly between the tool position Pck' and the present tool position Pc(k−1). On the other hand, when the distance Ki is greater than the predetermined value L [see FIG. 1(a)], this distance is partitioned into a plurality of set distances $l_0$, and a check is performed at each partitioning point Pnj (j=1, 2, . . . ) to determine whether the tool TL will intersect the shape approximating surface Sm. In case of intersection, the tool position of each point Pnj is corrected in the height direction so as to avoid intersection, and the rough machining NC data are created in such a manner that the tool will pass the tool position Pnj' [see FIG. 1(b)] resulting from the corrective processing.

Figure 2:
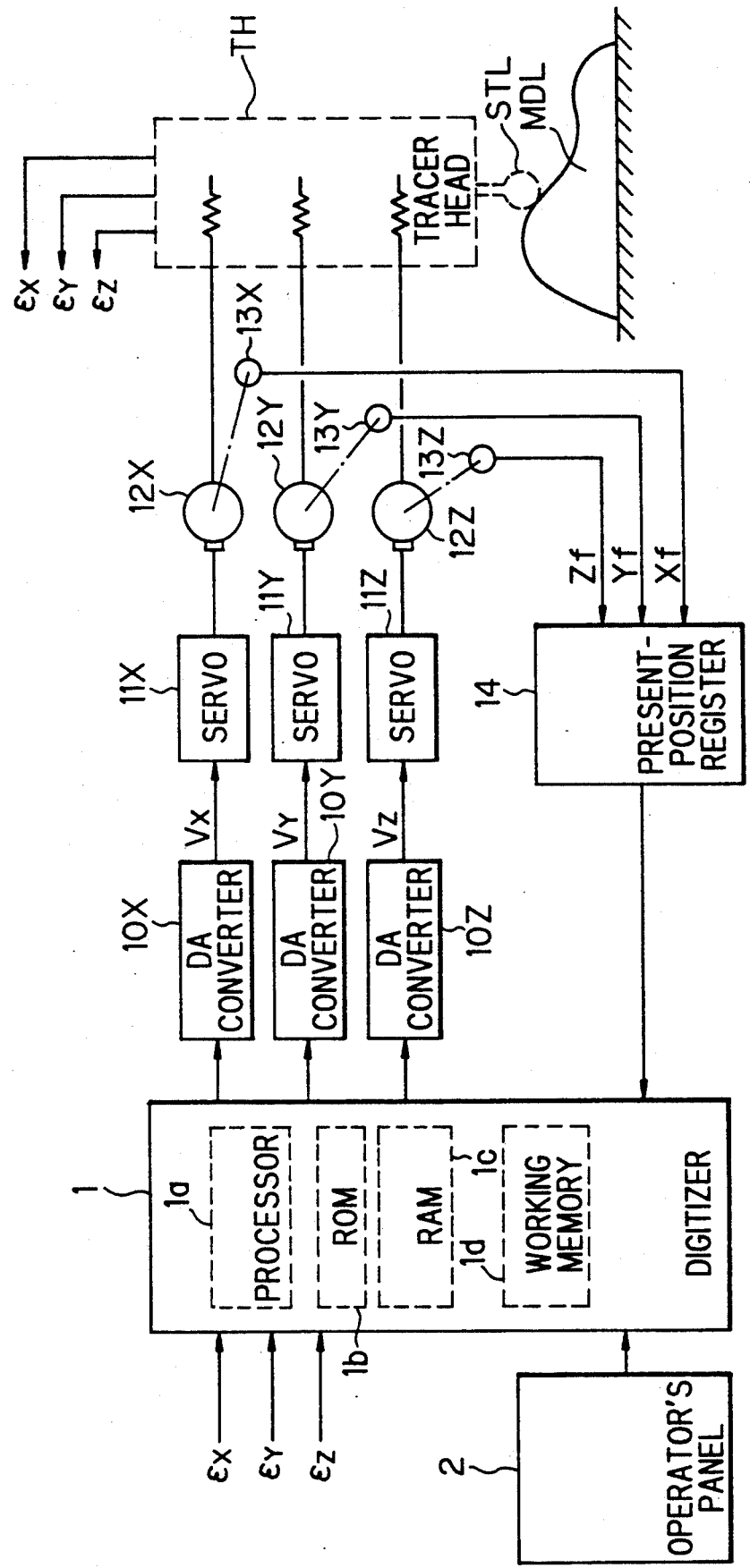
FIG. 2 is a block diagram of an apparatus (digitizer) for realizing the present invention.

FIG. 2 is a block diagram of an apparatus (digitizer) for realizing the method of the present invention. Numeral 1 denotes a digitizer equipped with a digitizing function for accepting and digitizing the present position of a tracer head while tracer control is being performed, as well as an NC data creation function and a tool interference checking function. The apparatus has a processor 1a, a ROM 1b storing a control program, a RAM 1c for storing digitized position data, and a working memory 1d.

Figure 4:
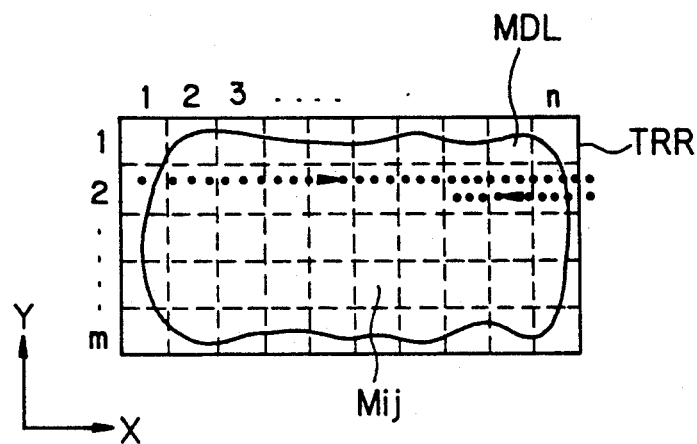
FIG. 4 is a view for describing tracing region and meshes.

Numeral 2 denotes an operator's panel having functions for inputting various operation signals and setting tracing conditions at the time of digitizing, tracing region TRR (see FIG. 4), tracing method, vertical and horizontal dimensions of meshes M(i,j), described below, tool radius R, and the like.

Numerals 10X, 10Y, 10Z denote DA converters for converting velocity data (digital values) along respective axes commanded by the digitizer 1 into analog velocity signals Vx, Vy, Vz. Numerals 11X, 11Y, 11Z denote X-, Y- and Z-axis servo circuits, respectively, 12X-12Z denote X-, Y- and Z-axis motors, respectively, and 13X-13Z represent pulse generators for generating single pulses Xf, Yf, Zf, respectively, each time the corresponding motors rotate through a predetermined angle. Numeral 14 designates a present position register for reversibly counting the pulses Xf, Yf, Zf, in accordance with the direction of movement, to store the present positions along the respective axes. Further, TH represents a tracer head, STL a stylus, and MDL a model.

Figure 3:
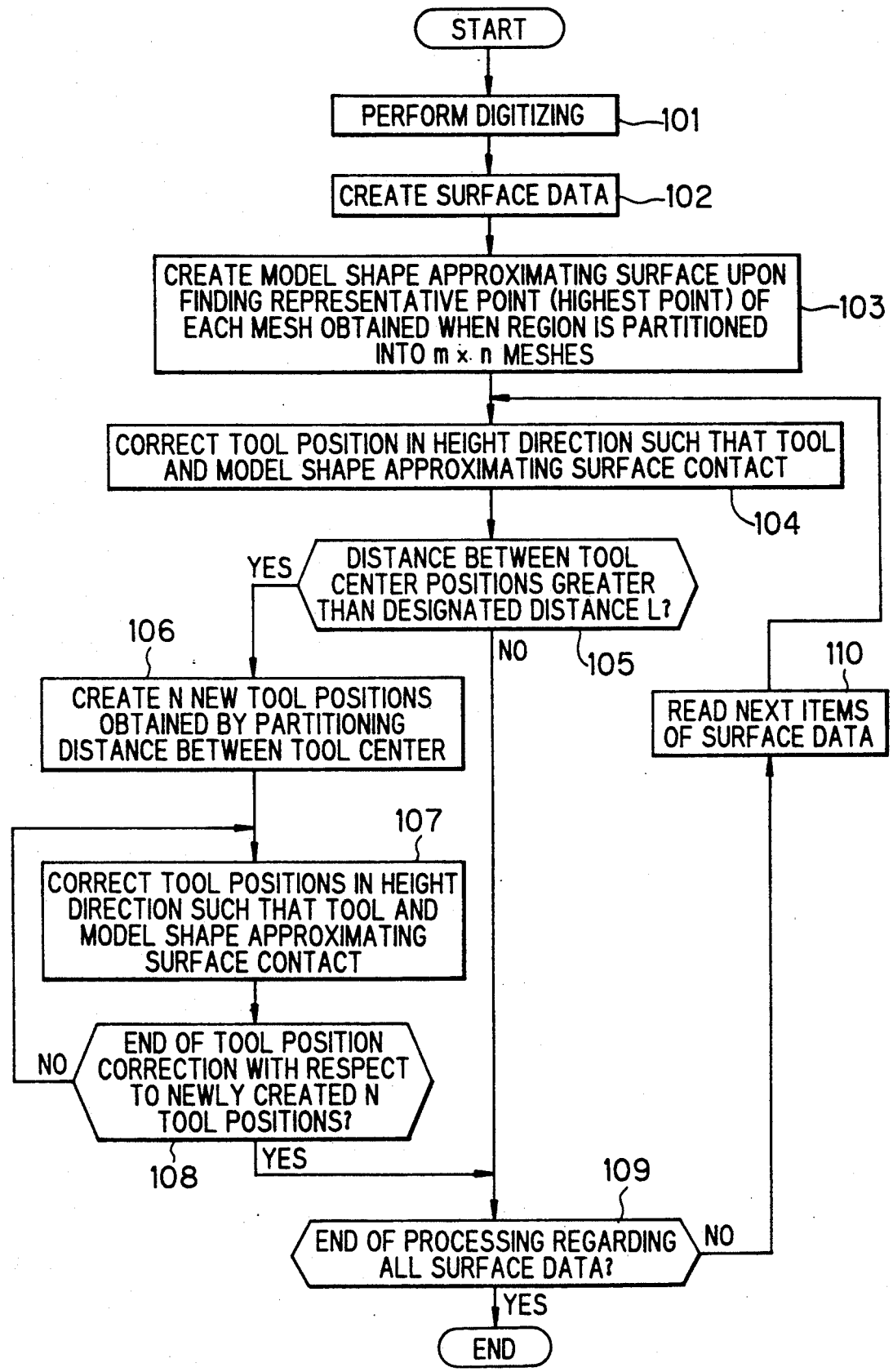
FIG. 3 is a flowchart of processing for creating NC data for rough machining according to the present invention.

FIG. 3 is a flowchart of processing for creating NC data for rough machining according to the present invention. Processing for creating NC data for rough machining according to the present invention will now be described in accordance with the flowchart of FIG. 3. It will be assumed that the tracing region TRR (see FIG. 4) and the vertical and horizontal dimensions of each mesh have already been entered from the operator's panel (see FIG. 2), and that the tracing region TRR has been partitioned into m x n meshes Mi,j (i=1−m, j=1−n). Further, it will be assumed that a distance L (e.g., a value, which is ¼ of the tool diameter, for minimizing cut-in), which serves as a reference in the case where the distance Ki described in FIG. 1 is partitioned, has also been entered from the operator's panel 2.

Figure 5:
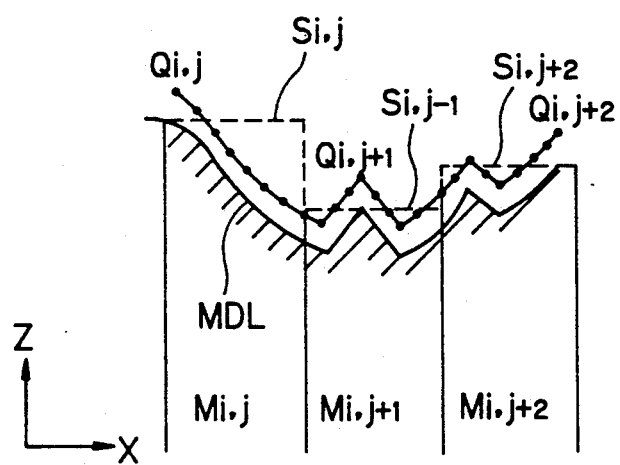
FIG. 5 is a view for describing digitizing points and a shape approximating surface.

Surface two-way tracing is carried out with the X, Y and Z axes serving as a feed axis, tracing axis and pick-feed axis, respectively. In concurrence with this tracing operation, surface data are created by accepting the coordinates of the stylus positions (positions indicated by the black dots in FIGS. 4 and 5) by well-known digitizing processing at predetermined times or whenever a set value exceeds a tolerance value, and the surface data are stored in the RAM 1c (steps 101, 102).

In concurrence with creation of the surface data, representative points of the meshes M(i,j) are obtained by a method, described below, and these points are stored in the working memory 1d. Specifically, storage areas for storing three-dimensional coordinates are established in the working memory 1d to correspond to the meshes M(i,j). Whenever the stylus position is accepted by digitizing processing, the position of contact between the model MDL and the stylus STL are obtained from the stylus position and a displacement quantity, and a check is made to determine to which mesh the contact position belongs. When the mesh M(i,j) to which the contact position belongs has been obtained, a check is made to see whether the contact position is an initial position of the mesh M(i,j). If the contact position is the initial position, a Z coordinate zn of the contact position is stored in the storage area of the mesh M(i,j). If the contact position is not the initial position, the Z coordinate ($z_o$) stored in the storage area corresponding to the mesh M(i,j) and the Z coordinate (zn) of the contact position are compared. If $$z_o \geq zn$$

holds, the content of the storage area is not updated. If $$z_o < zn$$

holds, zn is stored in the storage area (zn→$z_o$). If this processing is executed whenever the stylus position data are digitized, the coordinates of points having the largest Z coordinates among the points belonging to the meshes M(i,j) are stored in the storage areas of the working memory 1d that correspond to the meshes M(i,j). The machining shape in each mesh is approximated, in step-wise fashion, by a surface (referred to as a "shape approximating surface") S(i,j) (see the dashed line in FIG. 5) having the height of the representative point (step 103).

Next, the coordinates of the digitized points having the largest heights in the meshes are stored in the RAM 1c mesh by mesh, and these serve as points constituting a tool path for rough machining. It should be noted that the mesh center point of the shape approximately surface may be employed as a digitizing point for rough machining.

Figure 6:
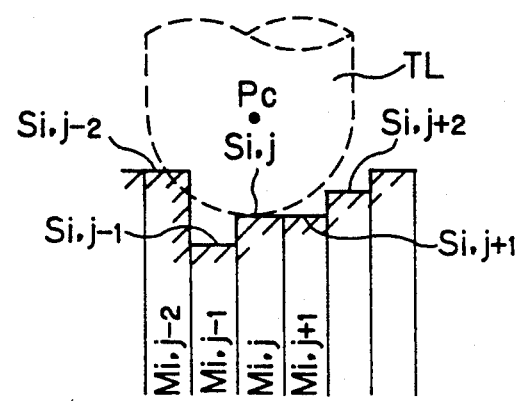
FIG. 6 is a view for describing an interference check.
Figure 7:
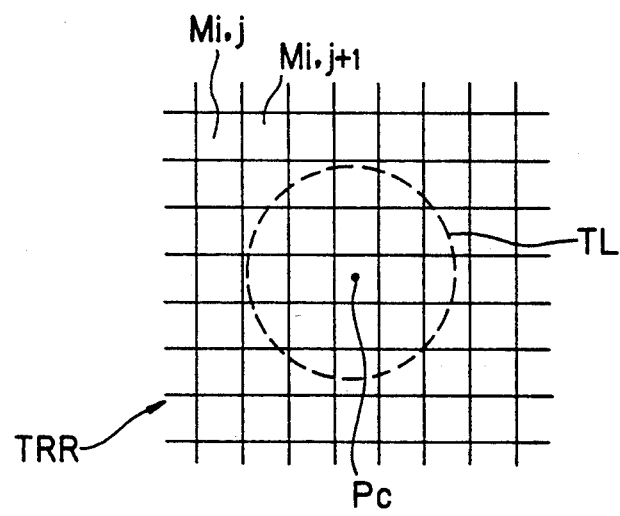
FIG. 7 is a view for describing a shape approximating surface which is the object of an interference check.

Thereafter, when the tool is offset by the tool diameter from the abovementioned point on the shape approximating surface, it is checked to see whether the tool will intersect the shape approximating surface (see FIG. 6). It should be noted that the shape approximating surfaces which are the object of the intersection check are those conforming to meshes (among which are meshes intersected) residing within the line (see the dashed line in FIG. 7) defining the external shape of the projection of the tool onto the XY plane.

Figure 8:
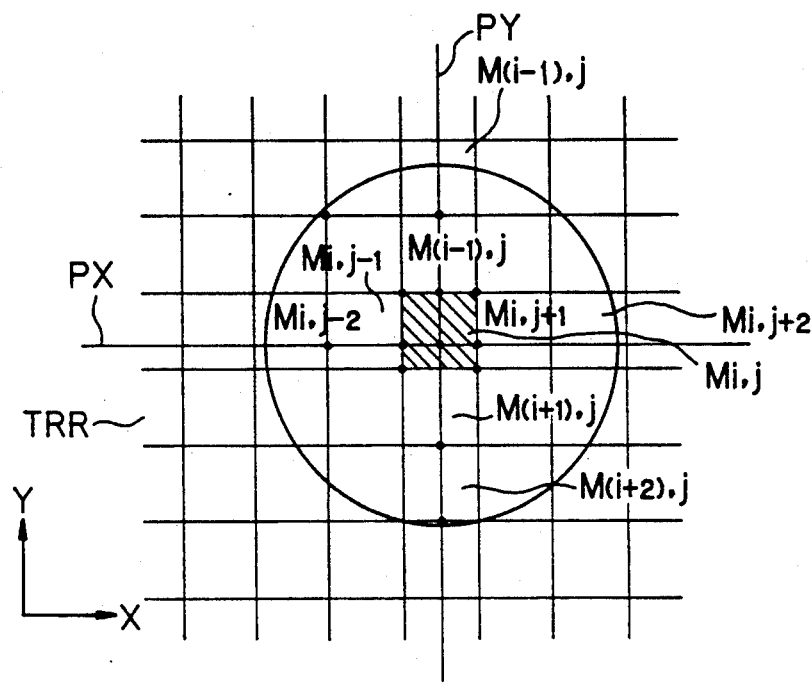
FIGS. 8 and 9 are views for describing an interference check.

The check to determine whether intersection occurs will be described hereinafter with reference to FIG. 8. Specifically, with regard to shape approximating surfaces corresponding to meshes M(i,j−2), M(i,j−1), M(i,j+1), M(i,j+2), M(i−2,j), M(i−1,j), M(i+1,j), M(i+2,j) in the same column and row as that of the mesh M(i,j) to which the center of the tool belongs, points of intersection between straight lines PX, PY, which pass through the position of the tool center and lie parallel to the X and Y axes, and the each mesh line are obtained, and points on shape approximating surfaces S(i,j−2), S(i,j−1), S(i,j+1), S (i,j+2), S(i−2,j), S(i−1,j), S(i+1,j), S(i+2,j) are obtained, these points being the projections of the abovementioned points of intersection). The tool radius R is compared with the distances from the tool center Pc to points on the shape approximating surfaces. If the distance is shorter than the tool radius, it is judged that intersection will occur. If the distance is greater, it is judged that intersection will not occur. With regard to shape approximating surfaces corresponding to meshes in the diagonal directions of the mesh M(i,j), points on the shape approximating surfaces corresponding to the corner points of each of the meshes nearest the tool nose position are obtained, after which a check made to determine whether the distance from the tool center to each point is shorter than the tool radius R. If it is shorter, it is judged that intersection will occur; if it greater, it is judged that intersection will not occur.

In the case of non-intersection, the tool center position is stored in the RAM 1c as a point on an offset path along which tool interference will not occur.

Figure 9:
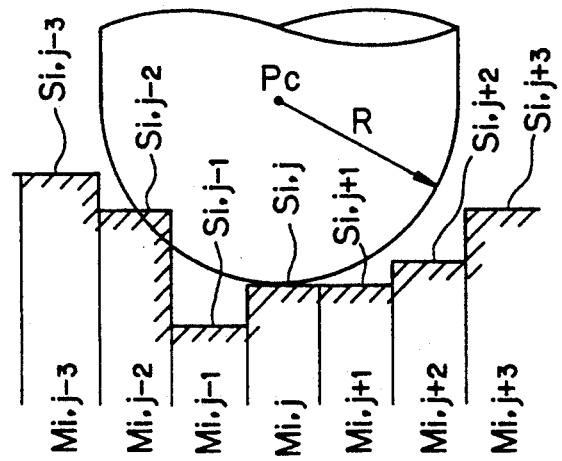
Figure 10:
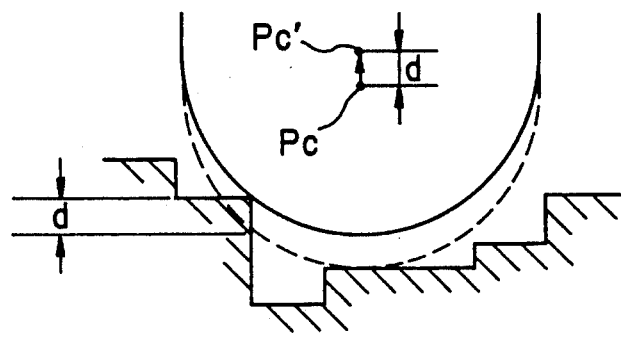
FIG. 10 is a view for describing a method of correcting digitizing points in case of interference.

In case of intersection, on the other hand (see FIG. 9), an amount of movement d (see FIG. 10) along the Z direction which will prevent the tool from interfering with any shape approximating surface is obtained.

Thereafter, assuming that the coordinates of the tool center Pc are (xi,yi,zi), the coordinates (xi,yi,zi+d) are stored in the RAM 1c as a point Pc' on the offset path along which tool interference will not occur (step 104).

Figure 11:
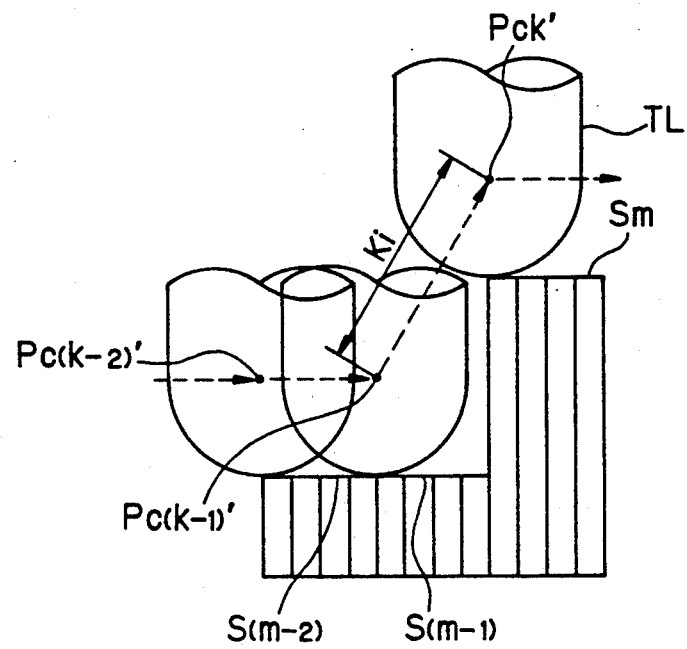
FIG. 11 for describing points on two adjacent offset paths.

Each time a point on the offset path is found, the processor 1a computes the distance Ki between the point Pck' (FIG. 11) on the latest present offset path and point Pc(k−1)' on the immediately preceding present offset path, and it is determined whether the distance Ki is greater than the predetermined distance L (e.g., a value that is ¼ of the tool diameter) (step 105). If the distance Ki is greater than the predetermined value L, processing from step 109 onward, the processing from step 109 onward is performed.

Figure 12A:
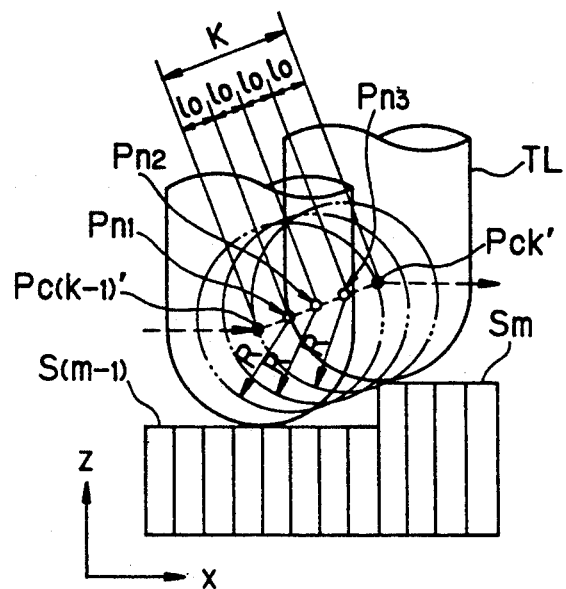
FIGS. 12(a) and 12(b) are explanatory views for correcting a rough machining path.

If the distance Ki is greater than the predetermined value L, on the other hand, an integral value n is found. This value is obtained by dividing the distance Ki by the predetermined distance L and raising the remainder. The distance Ki is partitioned at the integral value n. Let the N-number of partitioning points obtained be new tool center positions Pnj (j=1, 2, ... N) [see FIG. 1(a) and FIG. 12(a); step 106].

Figure 12B:
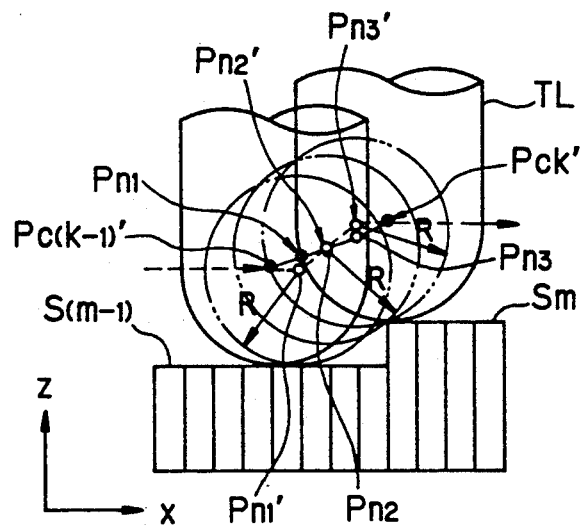
Figure 13A:
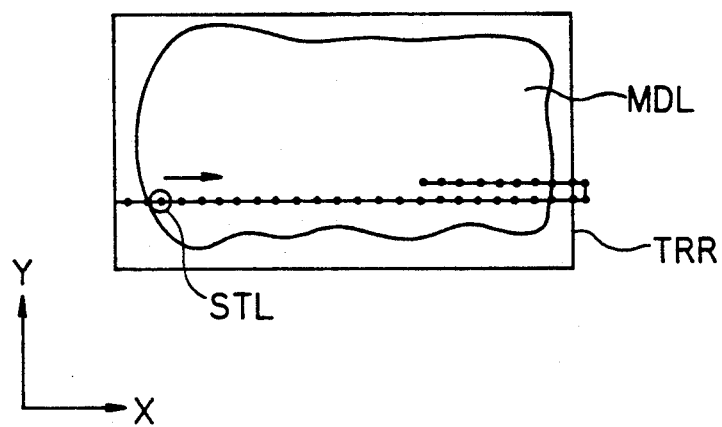
FIG. 13(a) and 13(b) are views for describing a digitizing method.
Figure 13B:
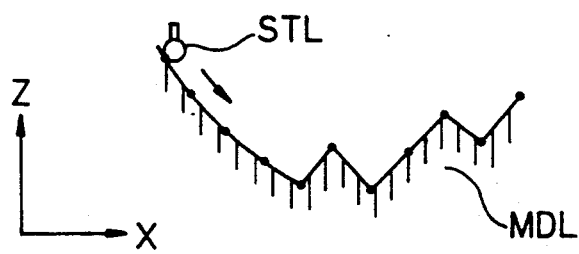
Figure 14:
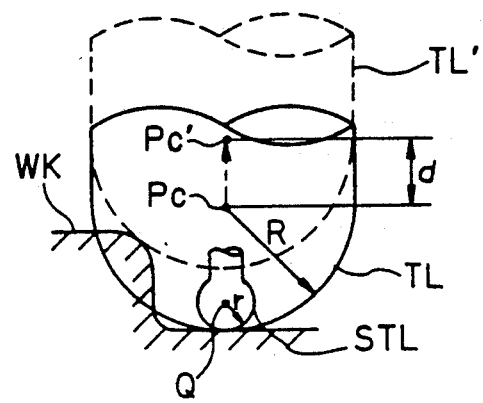
FIGS. 14 and 15 are views for describing the problems of an example of the prior art.
Figure 15:
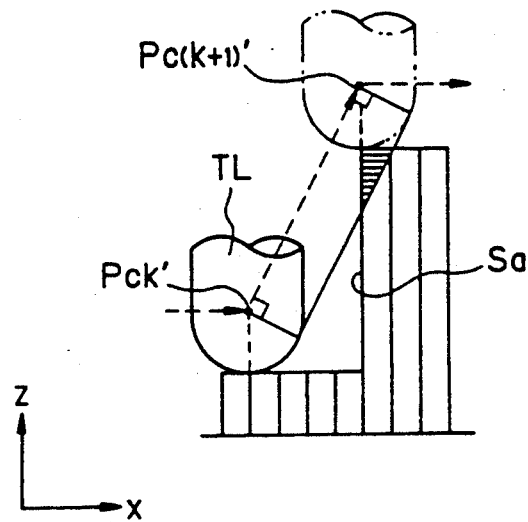

Next, it is checked at each point Pnj to see whether the tool having the radius R intersects a shape approximating surface. In case of intersection, an amount of movement along the Z direction for moving the tool TL until it will no longer interfere with any shape approximating surface is found. (By way of example, a sphere of radius R whose center is the point Pnj is found, and the amount of movement along the Z direction is that up to the position at which the sphere is tangent to the shape approximating surface.) Thereafter, each point Pnk is corrected in the height direction using the obtained amount of movement in the Z direction, and the corrected point Pnj' [see FIG. 1(b) and FIG. 12(b)] is stored in the RAM 1c as a point on the offset path. On the other hand, in a case where the tool does not interfere with the shape approximating surface at point Pnj [see point Pn₁ in FIG. 12(b)], the tool is moved in the Z direction to the position of contact with the shape approximating surface to effect a correction to Pn₁' (step 107).

Next, it is determined whether the correction has ended with regard to all of the N new tool center positions Pnj obtained by partitioning (step 108). If the correction has not ended, processing from step 107 onward is repeated.

On the other hand, if the correction has ended for all of the N new tool center positions Pnj obtained by partitioning, it is then determined whether processing has ended with respect to all points conforming to the mesh (step 109). If processing has not ended, points on the next mesh are read from the RAM 1c (step 110) and processing from step 104 onward is repeated.

When processing regarding all digitized points for rough machining has ended, the processing for creating the NC data for rough machining is terminated.

Thus, in accordance with the present invention, when the traveling distance between the next target tool position and the present tool position is less than a predetermined value, NC data for rough machining are created in such a manner that the tool moves linearly between the two tool positions. When the distance is greater than the predetermined value, this distance is partitioned into a plurality of distances and a check is performed at each partitioning point to determine whether the tool intersects a shape approximating surface. In case of intersection, tool position at each partitioning point is corrected in a height direction in such a manner that intersection will not occur, and NC data for rough machining are created in such a manner that the tool position resulting from the correction is traversed. As a result, the tool will no longer interfere with the workpiece when the tool is moved.

We claim:

1. A method of creating NC data for rough machining, said method comprising the steps of:
   (a) partitioning a digitized region into a plurality of meshes and obtaining, as representative points, a highest point for each mesh among points indicated by digitized data for each mesh;
   (b) approximating a machining shape in each mesh by a shape approximating surface having a height the same as that of the representative point obtained in step (a) for each mesh;
   (c) when a predetermined point on the shape approximating surface corresponding to each mesh is a point constituting a tool path position, checking at said predetermined point to determine whether or not the tool intersects another shape approximating surface approximated in step (b);
   (d) refraining from correcting the tool path position in case of non-intersection as checked in step (c), and in case of intersection as checked in step (c), correcting tool path position in a height direction to avoid intersection;
   (e) obtaining a distance between the tool path position following correction processing in step (d) and an immediately preceding tool path position;
   (f) when the distance obtained in step (e) is less than a predetermined value, creating NC data for rough machining in such a manner that the tool is moved linearly between the immediately preceding tool path position and the tool path position following correction processing in step (d);
   (g) when the distance obtained in step (e) is greater than the predetermined value, partitioning the distance into a plurality of segments between the tool path position following correction processing and the immediately preceding tool path position;
   (h) checking at each partitioning point partitioned in step (g) to determine whether the tool at each of the segments intersects said shape approximating surface approximated in step (b); and
   (i) in case of intersection as checked in step (h), correcting the tool position at each partitioning point in the height direction to avoid intersection, and creating NC data for rough machining in such a manner that each tool position will be traversed.

2. A method of creating NC data for rough machining according to claim 1,
wherein when said checking in step (h) determines the tool path positions do not intersect the shape approximating surface approximated in step (b) at each partitioning point partitioned in step (g), said correcting in step (d) is effected in the height direction in such a manner that said partitioning points are positioned to contact the shape approximating surface; and
wherein said creating the NC data for rough machining in step (i) creates the NC data in such a manner that the tool path position following said correcting in step (d) is traversed.

3. A method of creating tool movement paths to move a tool, having a center position, at a tool elevation sufficient to clear a workpiece surface, said method comprising the steps of:
   (a) creating tool movement paths between endpoints, the endpoints at a tool elevation sufficient for the tool to clear the workpiece surface;
   (b) partitioning the tool movement paths created in step (a) into a plurality of partitioning points along the tool movement paths when a distance between a center position of the tool at each endpoint is essentially greater than a predetermined distance;
   (c) determining whether the tool elevation of the tool movement paths created in step (a) will clear the workpiece surface for each partitioning point partitioned in step (b); and
   (d) correcting the tool elevation of the tool movement paths created in step (a) when said determining in step (c) determines the tool elevation will not clear the workpiece surface.

4. A method according to claim 3, wherein said partitioning in step (b) partitions the tool movement paths into the plurality of partitioning points until distances between the partitioning points along the tool movement paths are essentially less than the predetermined distance.

5. A method according to claim 3, wherein said creating in step (a) comprises the steps of:
   (a1) partitioning quantized surface data, representing the workpiece surface, into a plurality of meshes;
   (a2) determining, for each mesh partitioned in step (a1), a representative point representing each mesh's highest elevation; and
   (a3) creating the tool movement paths at the tool elevation sufficient for the center position of the tool to move through a mesh above its representative point determined in step (a2).

6. A method according to claim 5, wherein said partitioning in step (b) partitions the tool movement paths into a plurality of partitioning points until distances between the partitioning points along the tool movement paths are essentially less than the predetermined distance.

7. A method according to claim 5, further comprising the step of:
   (e) quantizing the workpiece surface using a stylus having a center position equal to the predetermined distance in step (b) before said partitioning in step (a1).

8. A method according to claim 3, further comprising the step of:
   (e) quantizing the workpiece surface using a stylus having a center position equal to the predetermined distance in step (b) before said creating in step (a).

9. A method according to claim 8, wherein said partitioning in step (b) partitions the tool movement paths into the plurality of partitioning points until distances between the partitioning points along the tool movement paths are essentially less than the predetermined distance.

10. A method according to claim 9, wherein said creating in step (a) comprises the steps of:
    (a1) partitioning quantized surface data, representing the workpiece surface, into a plurality of meshes;
    (a2) determining, for each mesh partitioned in step (a1), a representative point representing each mesh's highest elevation; and
    (a3) creating the tool movement paths at a tool elevation sufficient for the center position of the tool to move through a mesh above its representative point.

11. An apparatus for creating tool movement paths to move a tool, having a center position, at a tool elevation sufficient to clear a workpiece surface, said apparatus comprising:
    first means for creating tool movement paths between endpoints, the end points at a tool elevation sufficient for the tool to clear the workpiece surface;
    second means for partitioning the tool movement paths, created by said first means, into a plurality of partitioning points along the tool movement paths when a distance between a center position of the tool at each endpoint is essentially greater than a predetermined distance;
    third means for determining whether the tool elevation of the tool movement paths created by said first means will clear the workpiece surface for each partitioning point partitioned by said second means; and
    fourth means for correcting the tool elevation of the tool movement paths created by said first means when said third means determines the tool elevation will not clear the workpiece surface.

12. An apparatus according to claim 11, further comprising:
    a stylus having a center position equal to the predetermined distance.

13. An apparatus according to claim 11, wherein said first means includes:
    fifth means for partitioning quantized surface data, representing the workpiece surface, into a plurality of meshes;
    sixth means for determining, for each mesh partitioned by said fifth means, a representative point representing each mesh's highest elevation; and
    seventh means for creating the tool movement paths at a tool elevation sufficient for the center position of the tool to move through a mesh above its representative point.

14. An apparatus according to claim 11, wherein said second means partitions the tool movement paths into a plurality of partitioning points until distances between the partitioning points along the tool movement paths are essentially less than the predetermined distance.

* * * * *